(12) United States Patent
Campbell

(10) Patent No.: US 7,076,853 B2
(45) Date of Patent: Jul. 18, 2006

(54) METHOD FOR INFUSING POTTING COMPOUND INTO STRANDS OF A CABLE

(75) Inventor: Richard V. Campbell, Tallahassee, FL (US)

(73) Assignee: Bright Technologies, LLC, Havana, FL (US)

( * ) Notice: Subject to any disclaimer, the term of this patent is extended or adjusted under 35 U.S.C. 154(b) by 146 days.

(21) Appl. No.: 10/712,496

(22) Filed: Nov. 13, 2003

(65) Prior Publication Data

US 2004/0093714 A1    May 20, 2004

Related U.S. Application Data

(60) Provisional application No. 60/426,085, filed on Nov. 13, 2002.

(51) Int. Cl.
*H01B 13/00* (2006.01)
*B23P 25/00* (2006.01)

(52) U.S. Cl. .................. 29/458; 29/461; 29/527.1; 29/527.2; 428/378

(58) Field of Classification Search ............. 29/458, 29/461, 527.1, 527.2; 428/378, 392, 398, 428/375
See application file for complete search history.

(56) References Cited

U.S. PATENT DOCUMENTS

| 219,860 | A | * | 9/1879 | Healy | 403/209 |
|---|---|---|---|---|---|
| 2,177,567 | A | * | 10/1939 | Georges | 164/100 |
| 3,264,017 | A | * | 8/1966 | Howe | 403/302 |
| 3,588,966 | A | * | 6/1971 | Thompson et al. | 403/265 |
| 4,923,537 | A | * | 5/1990 | Matsushima | 156/48 |
| 5,493,934 | A | * | 2/1996 | Kelley | 74/502.6 |
| 6,058,603 | A | * | 5/2000 | Reed | 29/857 |

* cited by examiner

*Primary Examiner*—Jermie E. Cozart
(74) *Attorney, Agent, or Firm*—John Wiley Horton

(57) ABSTRACT

A process for producing a potting transition which is more nearly planar and which is more repeatable from assembly to assembly. Devices for carrying out the process are also disclosed. A stranded cable comprising a containment jacket is stripped of its containment jacket for a short length to expose the end strands for termination (Obviously, in the case of a cable having no jacket, no stripping is required). The exposed strands are then placed in a barrier device to separate them into a region of exposed strands and a region of guarded strands. Potting compound is then applied to the exposed region. The barrier device prevents the potting compound from penetrating into the guarded region. The result is a distinct transition between a region of strands which have been wetted by the liquid potting compound ("wetted region") and a region of strands which have not been wetted by the liquid potting compound ("unwetted region").

9 Claims, 23 Drawing Sheets

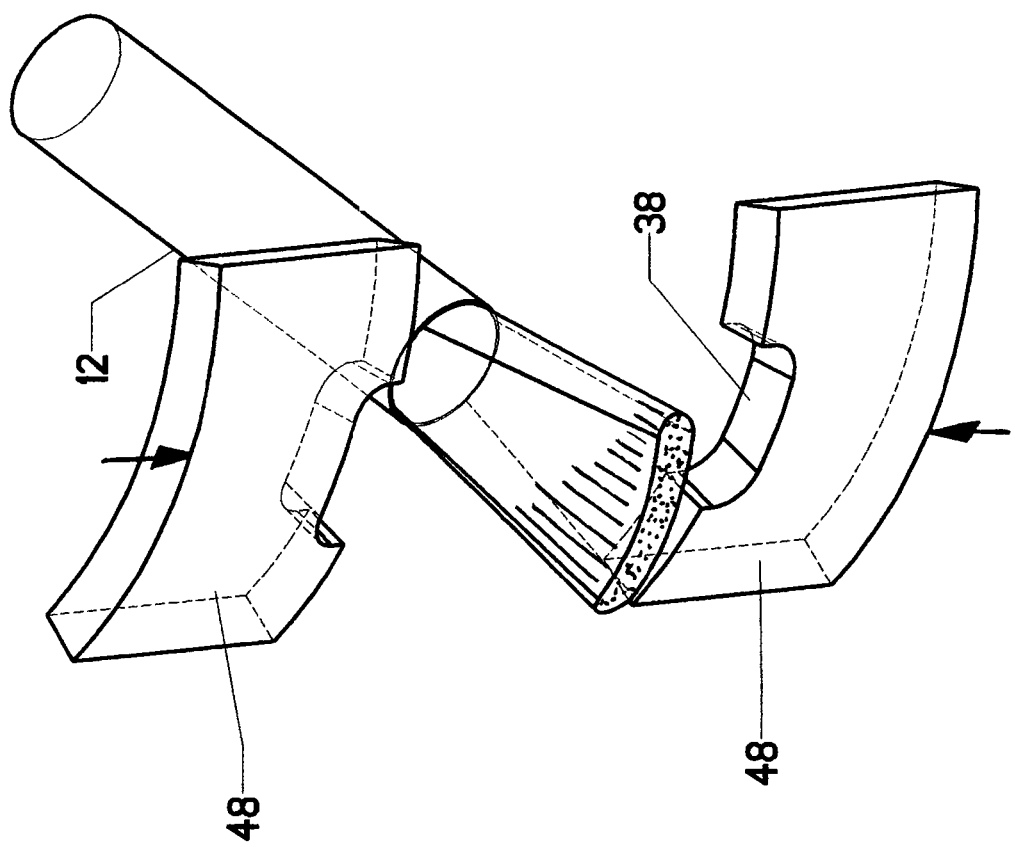

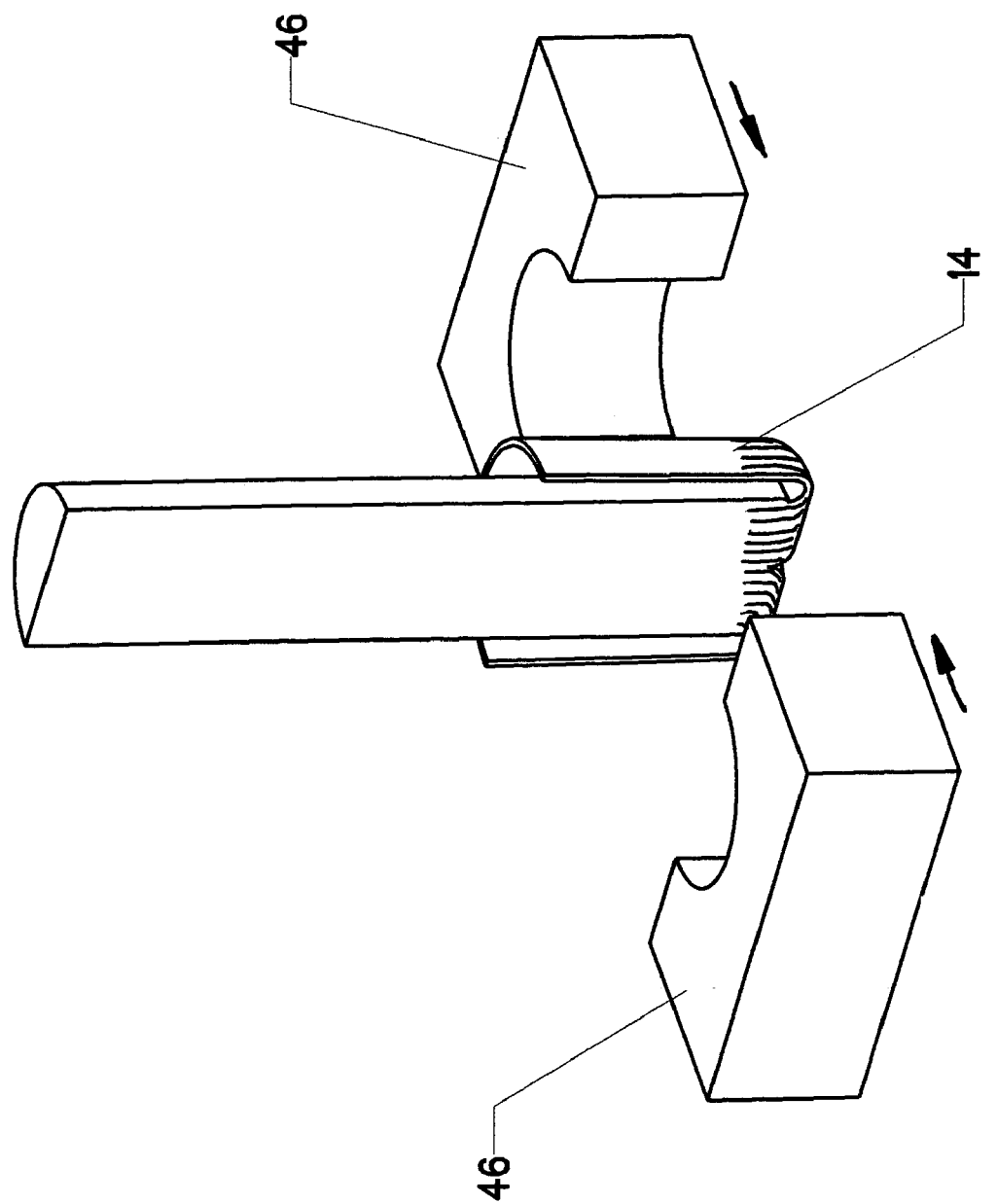

METHOD FOR INFUSING POTTING COMPOUND INTO STRANDS OF A CABLE

CROSS-REFERENCES TO RELATED APPLICATIONS

Pursuant to the provisions of 37 CFR §1.53(c), this application claims the benefit of an earlier-filed provisional application. The provisional application was assigned Ser. No. 60/426,085. It was filed on Nov. 13, 2002.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of rope and cable. More specifically, the invention comprises a method for potting cable terminations, along with devices for carrying out the method.

2. Description of the Related Art

Devices for mounting a termination on the end of a rope or cable are disclosed in detail in copending U.S. application Ser. No. 60/404,973 to Campbell, which is incorporated herein by reference. Generally, the strands proximate the end of a cable are wetted with a potting compound to affix them to an anchor (The term "anchor" is used to refer generally to any object affixed to a cable in order to transmit a load to or from the cable).

FIG. 1 shows a cable 10 ready for the application of a potting process. Those skilled in the art will know that a cable is generally composed of a bundle of smaller strands. Over most of its length, the strands within cable 10 will generally be held in place by a containment jacket 12 (which may be an extruded plastic jacket, a braided strand jacket, or similar encircling sheath). In other cases, no encircling jacket will be present. For these, a tape sheath or other compressing method such as a string wrap must be used to organize the strands for potting. However it is done, a length of strands must be exposed for potting (meaning that they can be infused with potting resin). In the view, these are designated as exposed strands 14.

In order to lock the cable to an anchor, exposed strands 14 must be wetted with a potting compound. This is typically done in one of two ways: (1) An anchor is pulled around the exposed strands to hold them in place while a potting compound is poured into them, or (2) The exposed strands are wetted and then an anchor is pulled over the exposed strands to form them into the proper shape. FIG. 2 shows a completed termination, with anchor 40 being locked to potted region 22.

However the potting compound is applied, there will be a transition between the unpotted strands and the potted strands. This is referenced as potting transition 20 in the figure. The reader will note that potting transition 20 is irregular. It is difficult for the potting compound to penetrate to the center of the cable. Even though the strands are splayed prior to potting, those strands near the center tend to remain bunched together, inhibiting the penetration of the liquid potting resin (designated as central strand region 16).

The bunching lessens toward the periphery of the cable and in the vicinity of the end of the cable (designated as end strand region 18). Because of this variation in strand density, uneven penetration of the potting compound often results. This fact introduces inconsistency from assembly to assembly, since the location and shape of potting transition 20 varies significantly. When attempting to pre-wet the strands, the center strands also tend to be guarded somewhat by the cable itself. Consistency in the application of the potting compound therefore suffers.

Throughout this disclosure, the term "strand" will be used to describe the constituents of synthetic cables, natural-fiber cables, and wire ropes. Although synthetic cables are used for the illustrations, the reader should understand that the methods and devices disclosed are equally applicable to any type of stranded cable.

BRIEF SUMMARY OF THE PRESENT INVENTION

The present invention comprises a process for producing a potting transition which is more nearly planar and which is more repeatable from assembly to assembly. Devices for carrying out the process are also disclosed. A stranded cable comprising a containment jacket is stripped of its containment jacket for a short length to expose the end strands for termination (Obviously, in the case of a cable having no jacket, no stripping is required). The exposed strands are then placed in a barrier device to separate them into an exposed region and a guarded region. Potting compound is then applied to the exposed region. The barrier device prevents the potting compound from penetrating into the guarded region. The result is a distinct transition between a region of strands which have been wetted by the liquid potting compound ("wetted region") and a region of strands which have not been wetted by the liquid potting compound ("unwetted region").

Once the application of the potting compound is complete, the stranded cable is removed from the barrier device and an anchor is applied over the wetted region. The potting compound then turns from a liquid to a solid over a period of time. Once the potting compound has turned solid, the wetted region of strands are said to be the "potted region" (meaning a region where the strands are locked within a solid mass of hardened potting compound). The unwetted region—in which the strands remain dry and free—is said to be the "unpotted region." The result is a more uniform distribution of potting compound and a more nearly planar transition from unpotted region to potted region.

BRIEF DESCRIPTION OF THE SEVERAL VIEWS OF THE DRAWINGS

FIG. 15 is an isometric view, showing the use of a curved linear barrier.

FIG. 16 is an isometric view, showing a clamp designed for strands which have been folded back over the cable.

REFERENCE NUMERALS IN THE DRAWINGS

| | |
|---|---|
| 10 | cable |
| 12 | containment jacket |
| 14 | exposed strands |
| 16 | central strand region |
| 18 | end strand region |
| 20 | potting transition |
| 22 | potted region |
| 24 | splayed strands |
| 26 | upper barrier |
| 28 | lower barrier |
| 30 | barrier edge |
| 32 | exposed region |
| 34 | guarded region |
| 36 | linear barrier |
| 38 | strand slot |
| 40 | anchor |
| 42 | conical barrier surface |
| 44 | flat barrier surface |
| 46 | cylindrical clamp |
| 48 | curve barrier |
| 50 | collar |
| 52 | O-ring |
| 54 | groove |
| 56 | vee clamp |
| 58 | mold cavity |
| 60 | injection port |

DETAILED DESCRIPTION OF THE INVENTION

Figure 1:
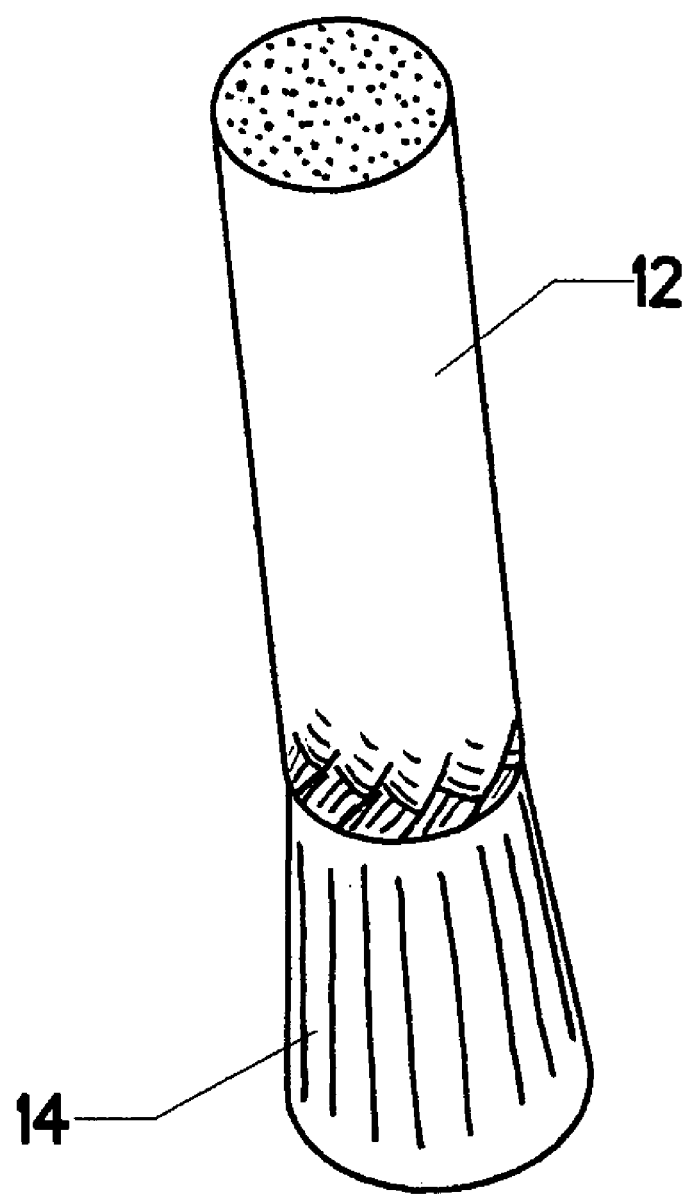
FIG. 1 is an isometric view, showing a prior art cable ready for termination.
Figure 2:
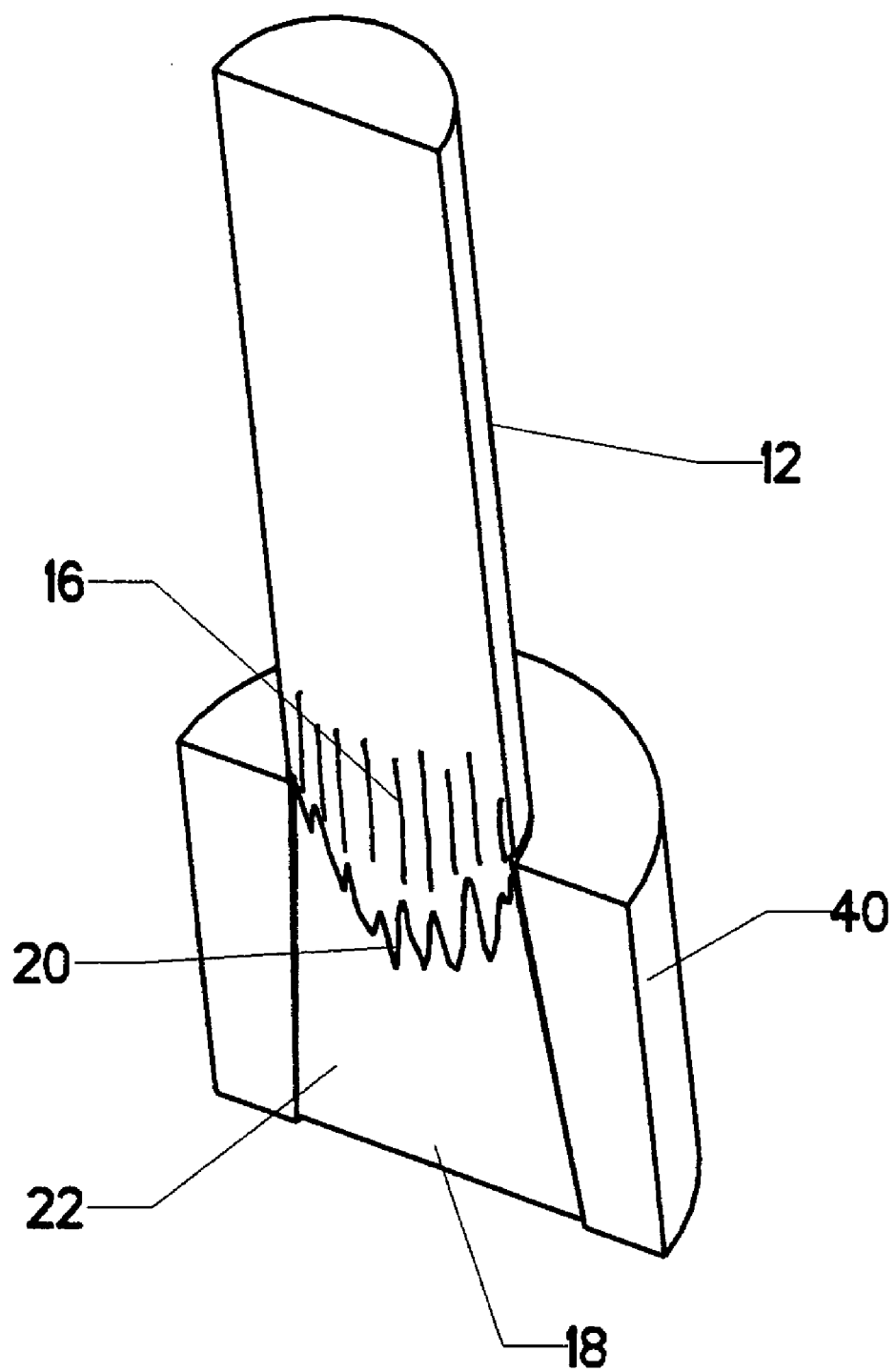
FIG. 2 is an isometric section view, showing a prior art cable termination.
Figure 3:
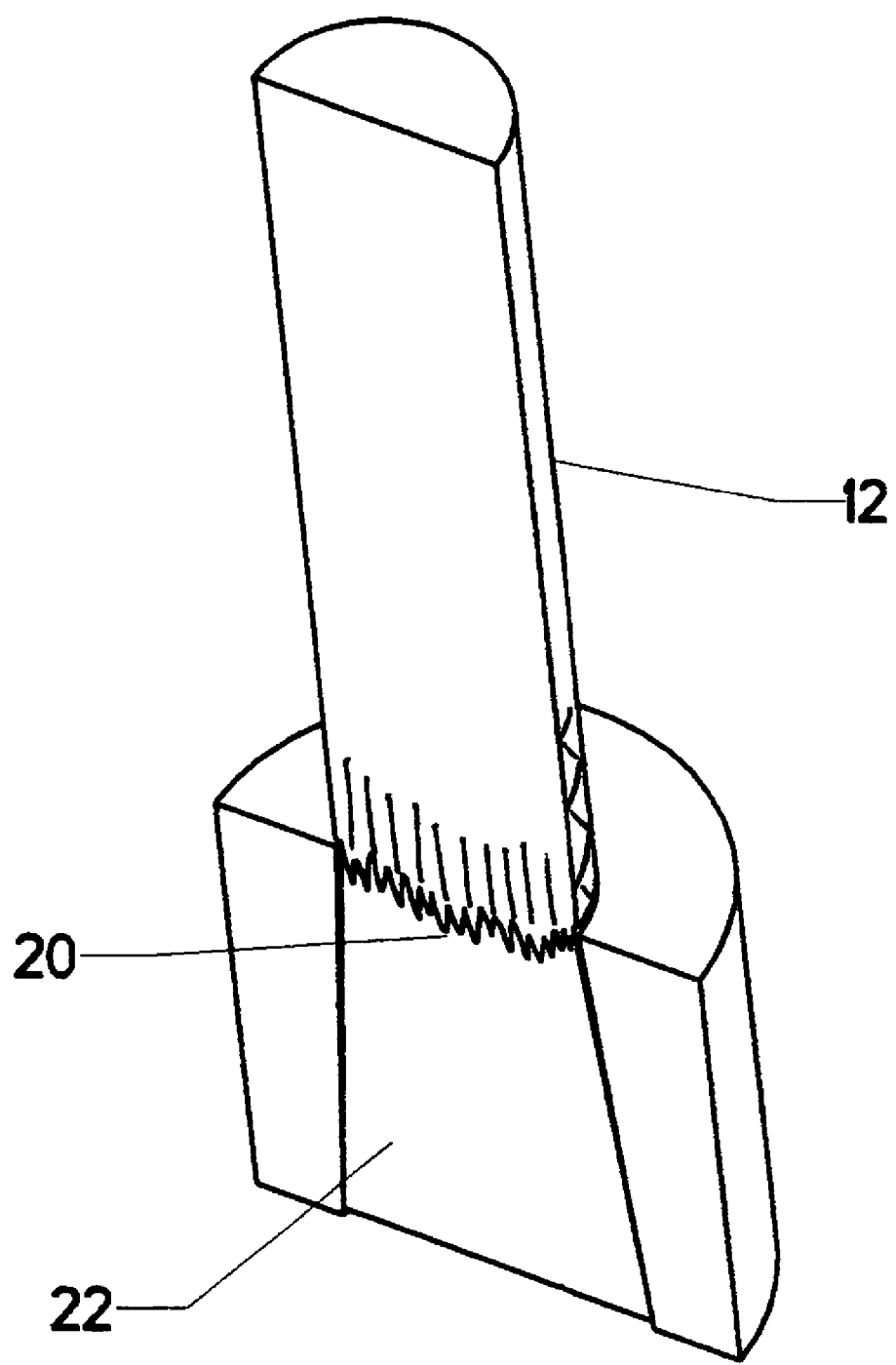
FIG. 3 is an isometric section view, showing a potted cable according to the present invention.

FIG. 3 shows an idealized potting transition 20 which is more nearly planar, and consistent in its saturation and density. It is also displaced from the end of containment jacket 12 (or compression tape unit or string binding unit in the case of an unjacketed cable). In this particular anchor, potted region 22 only consumes a portion of the region of exposed strands 14. The potting compound is only applied to the relatively loose strands lying near the cable's end. The strand spacing in this region is relatively uniform (and dispersed), resulting in a thorough and even penetration of the potting compound. The present invention primarily concerns how to achieve this result. The present invention also provides the opportunity to use thicker potting compounds and processes which can be more easily automated.

Figure 4:
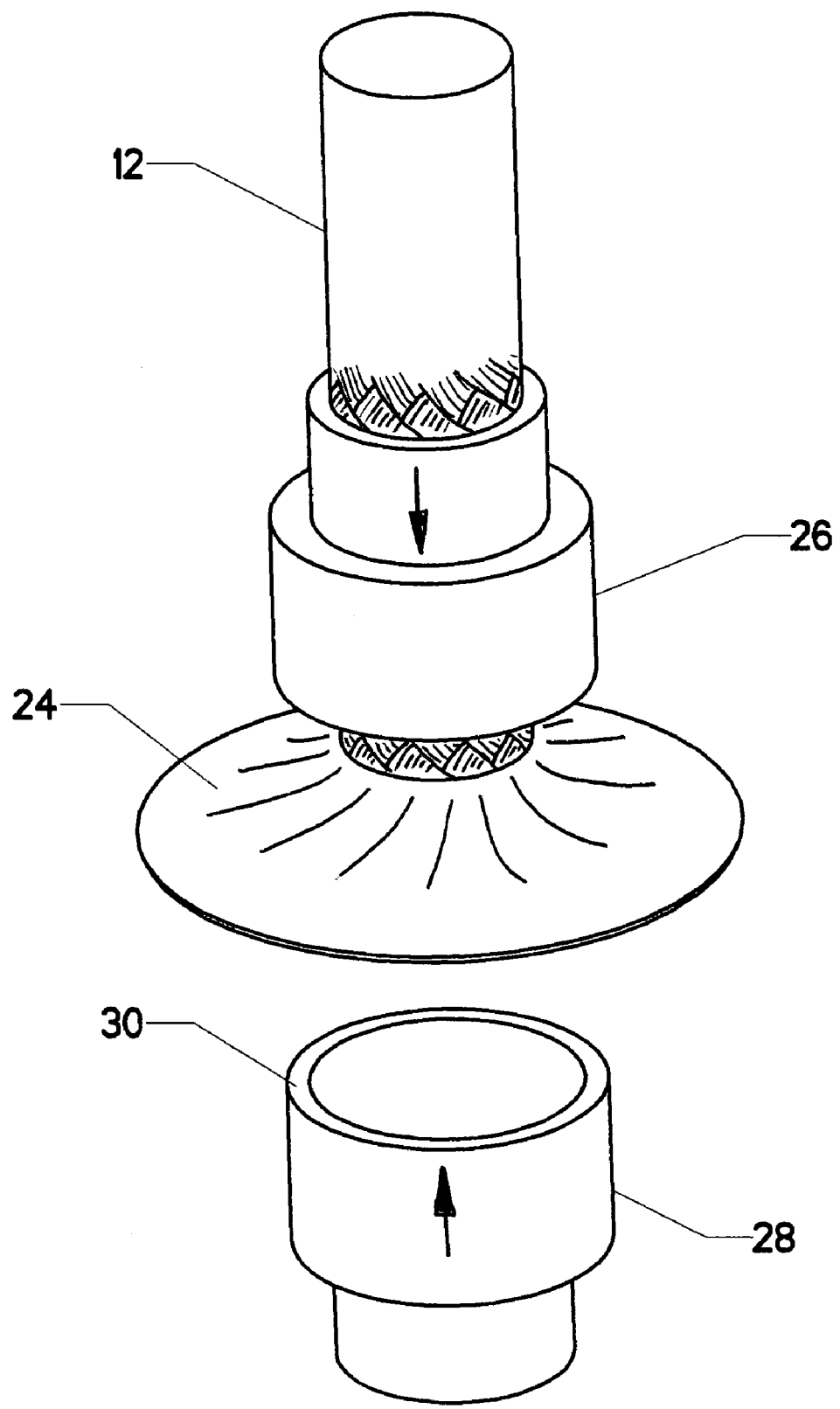
FIG. 4 is an isometric view, showing the proposed process.
Figure 5:
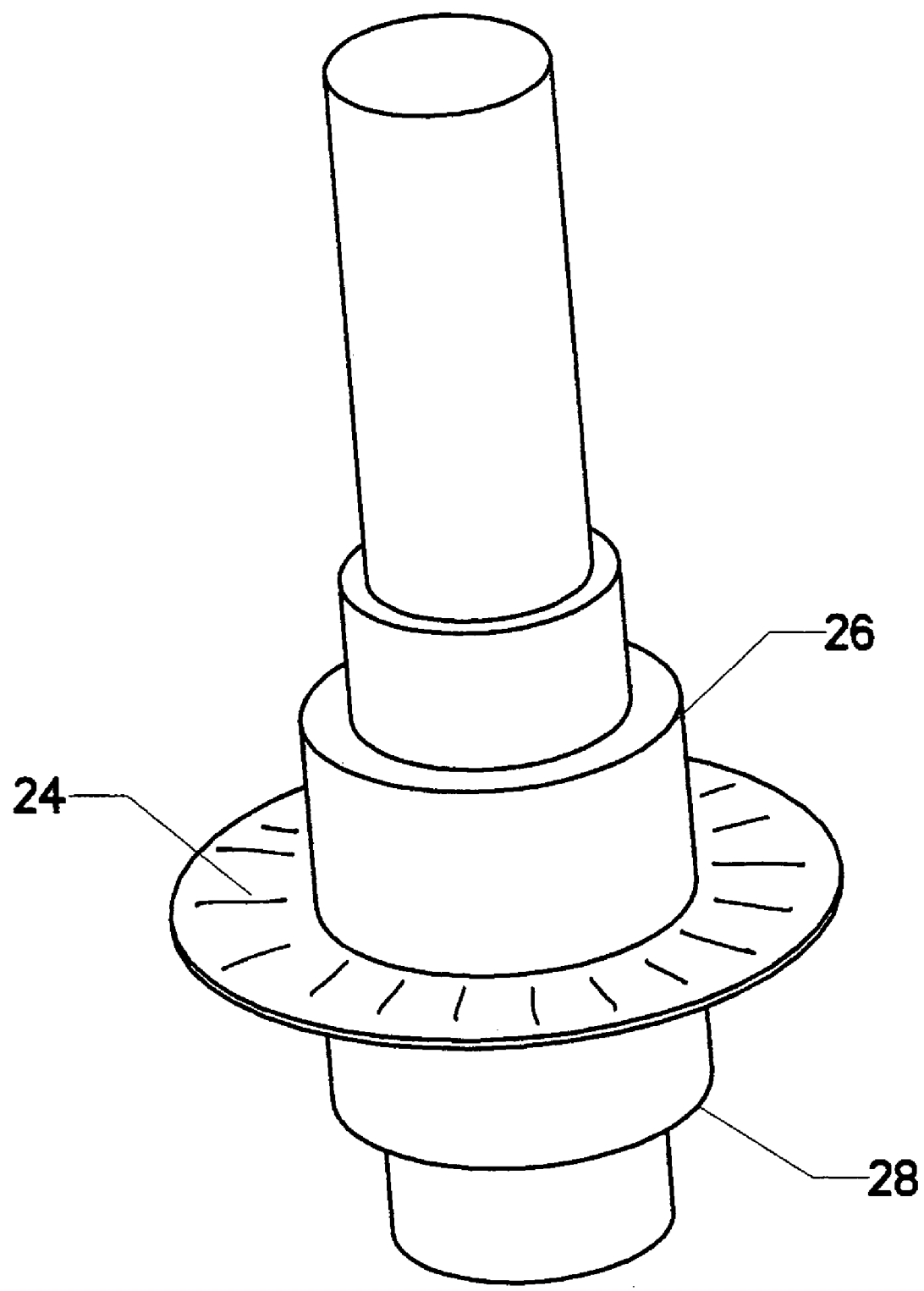
FIG. 5 is an isometric view, showing the proposed process.

In FIG. 4, a length of strands on one end of a cable has been exposed. This length naturally has a free end and a fixed end which is affixed to the cable itself. The free end can be bent and flexed, while the fixed end is generally held in place by the cable. Cable 10 has been passed upward through upper barrier 26 (which may conventionally be attached to a jig or fixture). The free end of exposed strands 14 have then been splayed by conventional means into the form of splayed strands 24. The fixed end merges into the cylindrical shape of the cable. Upper barrier 26 and lower barrier 28 are then moved together to clamp over splayed strands 24. FIG. 5 shows upper barrier 26 and lower barrier 28 holding splayed strands 24 (Throughout this disclosure, the terms "upper" and "lower" will be understood to refer only to the orientations shown in the views, and not to any limitation on the scope of the invention. The devices shown can obviously be applied in many different orientations).

Figure 6:
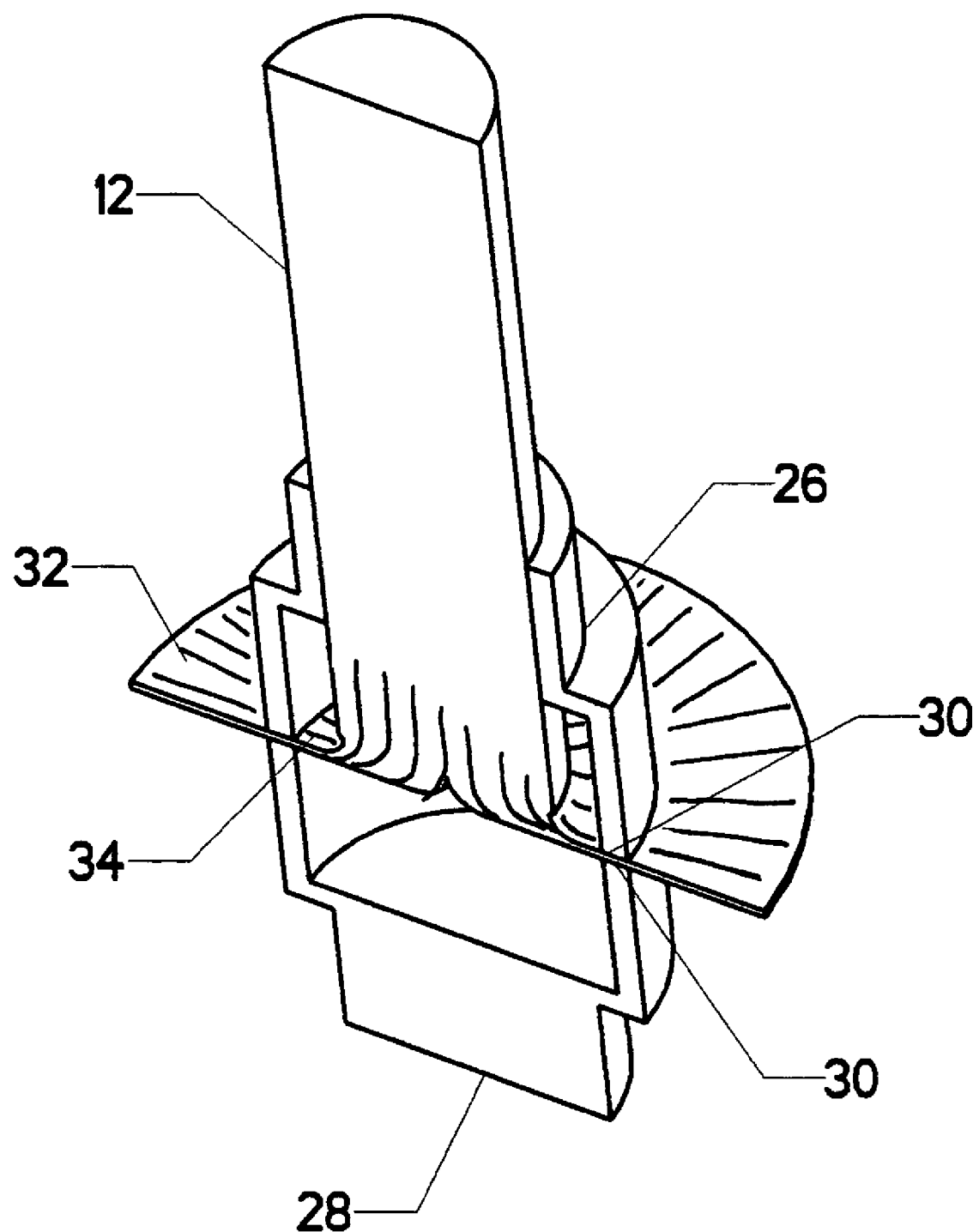
FIG. 6 is an isometric section view, showing the proposed process.

FIG. 6 is a section view showing internal details. The reader will observe that—in this particular embodiment, the two barriers have hollow interiors. The result is that they only contact splayed strands 24 along barrier edges 30. The two barriers could also be solid—thereby contacting the splayed strands over a plane (although the upper barrier must also have a through-hole to allow the cable itself to pass through). However, the use of an edge contact helps to hold the splayed strands at the point of contact. Splayed strands 24 have thereby been divided into two separate regions—exposed region 32 and guarded region 34.

While held in the position shown, potting compound is applied to exposed region 32. This can be done by dispensing the compound through a pressurized dispenser, dipping the entire assembly into a vat, painting the compound on manually, spraying the compound, or using other conventional means. However it is applied, the barrier devices prevent the potting compound from seeping into guarded region 34. The cable is then removed from the barrier devices and an anchor is slid into position over the wetted strands, resulting in the assembly shown in FIG. 3.

Upper barrier 26 is shown in FIG. 6 as a solid piece, which requires that the cable be slipped through a hole in its center. This approach may be undesirable on some occasions, since passing the cable through a central hole could fray the exposed strands. To alleviate this concern, the upper barrier can be split into two or more pieces (like a mold), which clamp together over the cable.

Figure 7:
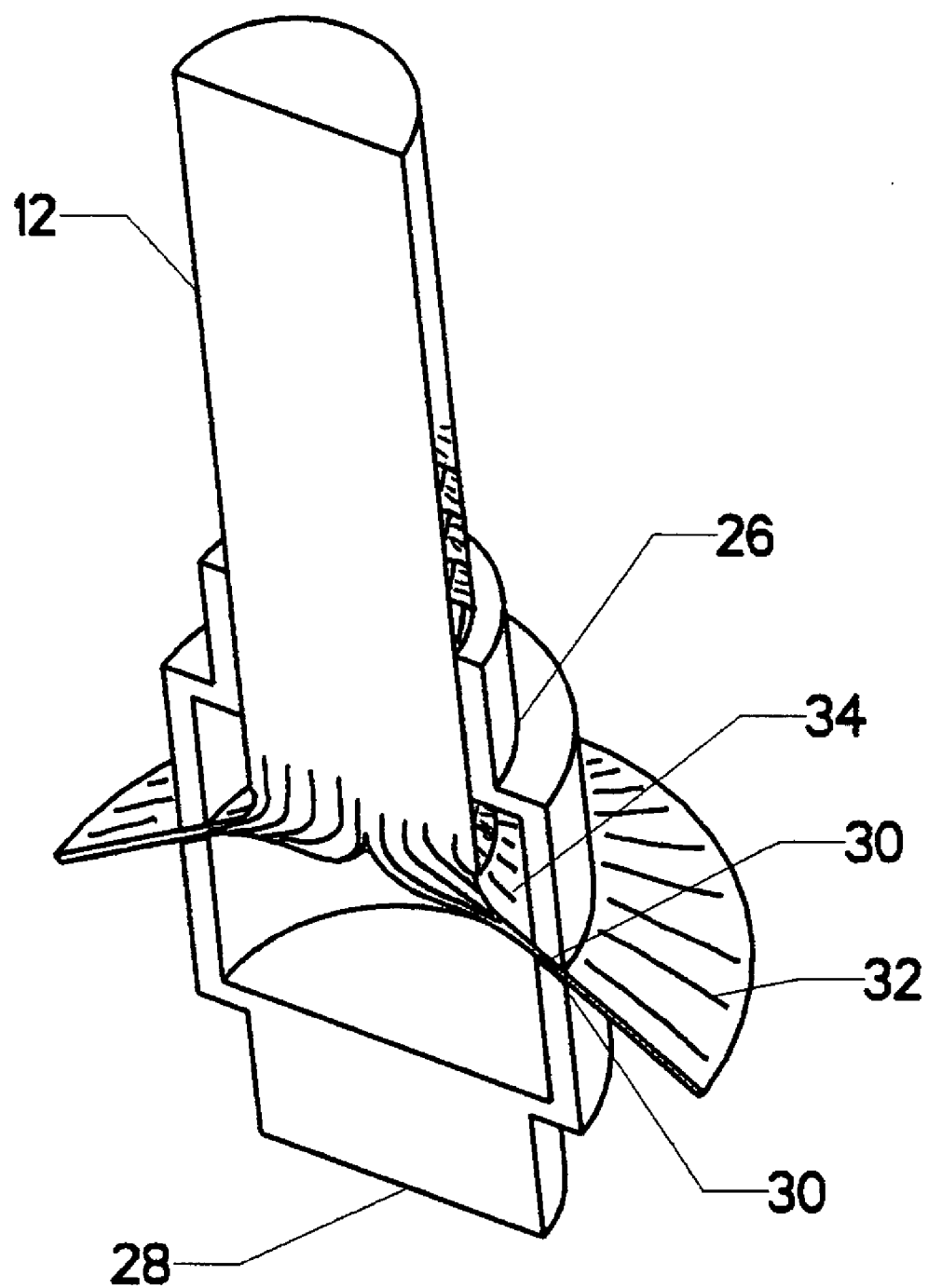
FIG. 7 is an isometric section view, showing the proposed process.

Barrier devices similar to those disclosed in FIGS. 4–6 can be configured to carry out the strand wetting process in a variety of ways. Altered versions of the two barriers are shown in FIG. 7. The conical shape of the joint between upper barrier 26 and lower barrier 28 clamp the splayed strands into a truncated cone shape (The downward facing and upward facing barrier edges 30 assume the shape of a truncated cone). Such a shape may be advantageous for dipping or other processes.

Figure 8:
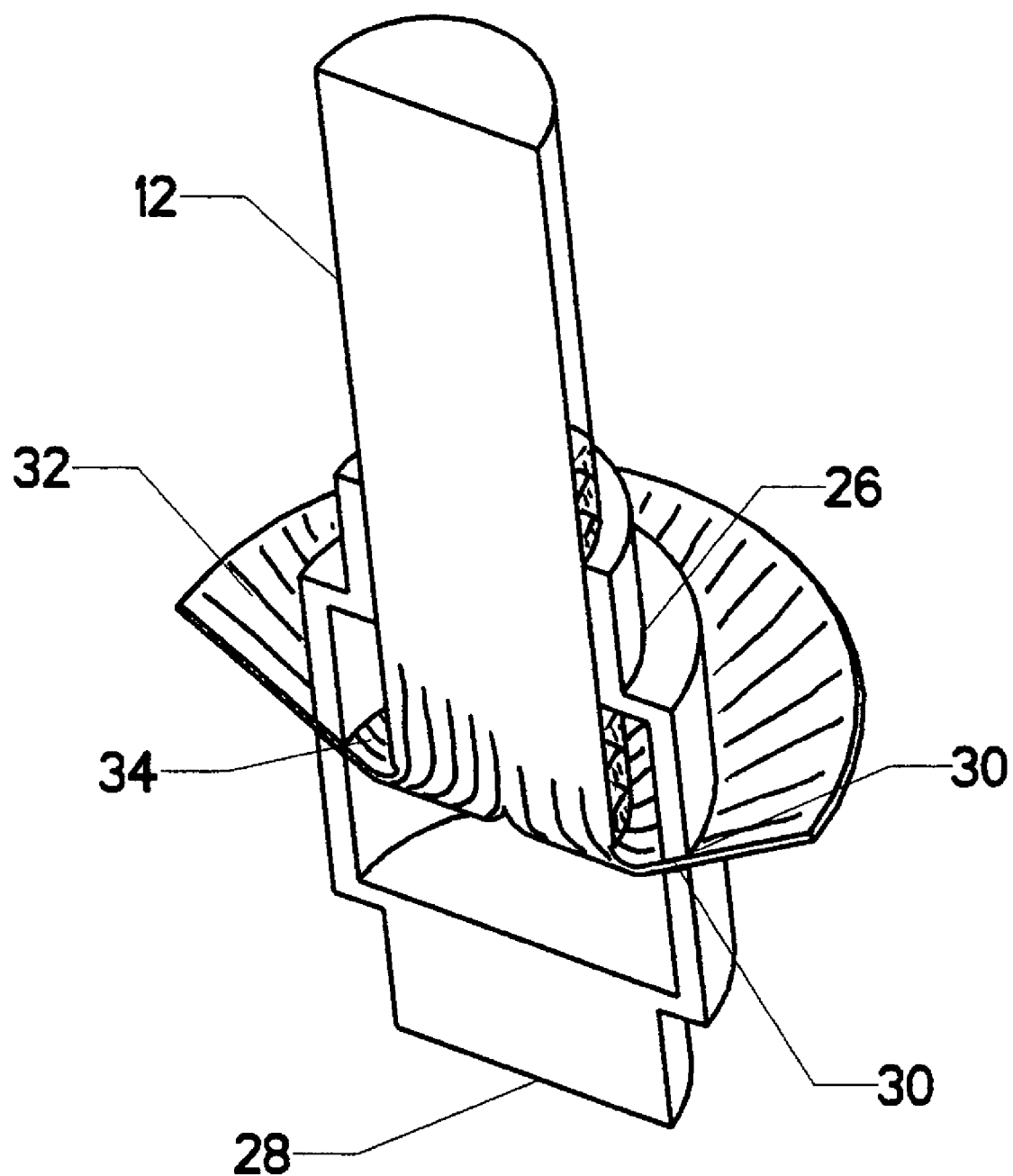
FIG. 8 is an isometric section view, showing the proposed process.

In FIG. 8, third versions of upper barrier 26 and lower barrier 28 are shown. These embodiments clamp the splayed strands in an inverted truncated cone shape, which may be advantageous for painting on the potting compound or other processes.

Figure 12:
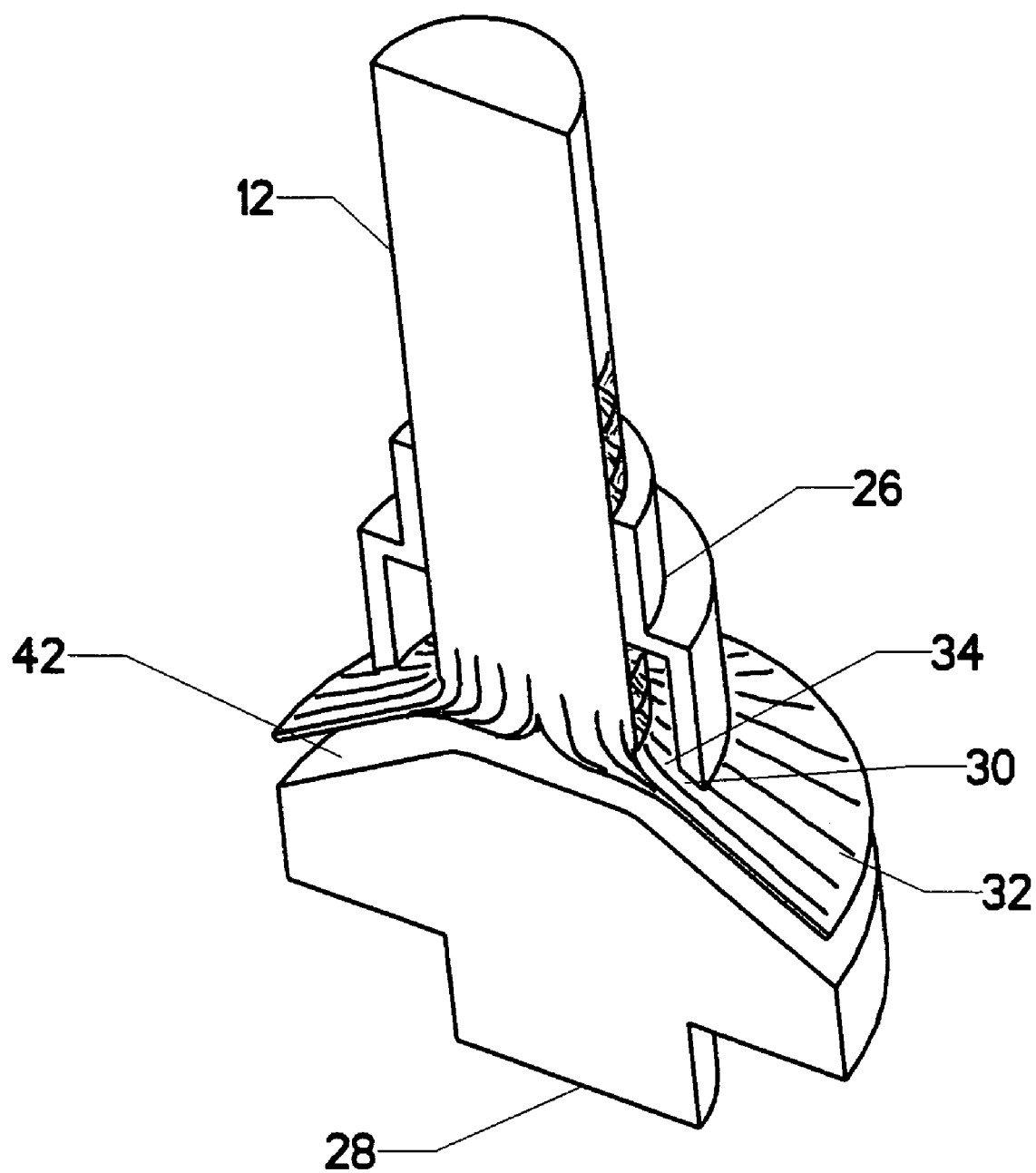
FIG. 12 is an isometric view, showing a conical barrier surface.

The shape of the lower barrier can be improved to facilitate the splaying of the strands. FIG. 12 shows a lower barrier 28 incorporating a conical barrier surface 42. When the upper and lower barriers are clamped together, the shape of the conical barrier surface helps to ease the strands into the splayed conical shape.

Figure 13:
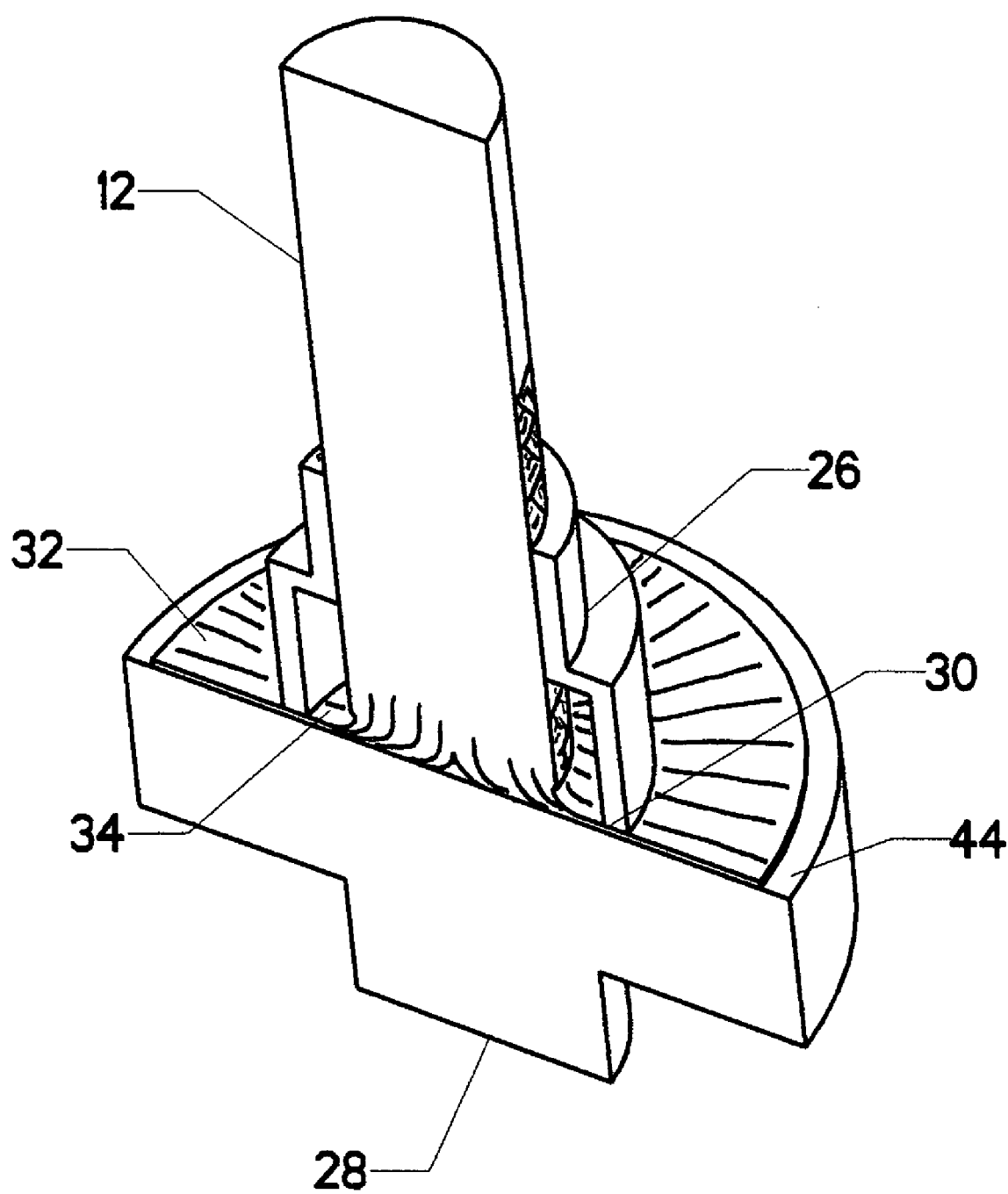
FIG. 13 is an isometric view, showing a planar barrier surface.

A simple flat surface can also be used for the lower barrier. FIG. 13 shows a lower barrier incorporating flat barrier surface 44.

An alternative to using barrier edges 30 would be to employ two flat plates with an incorporated O-ring or O-rings to form the seal. A cooperating O-ring in one plate and groove in the other could also be used. The result would be essentially the same, in that the strands would be divided into a guarded and unguarded region. It is also possible to incorporate a dish holding the liquid potting resin into the lower barrier.

Figure 20:
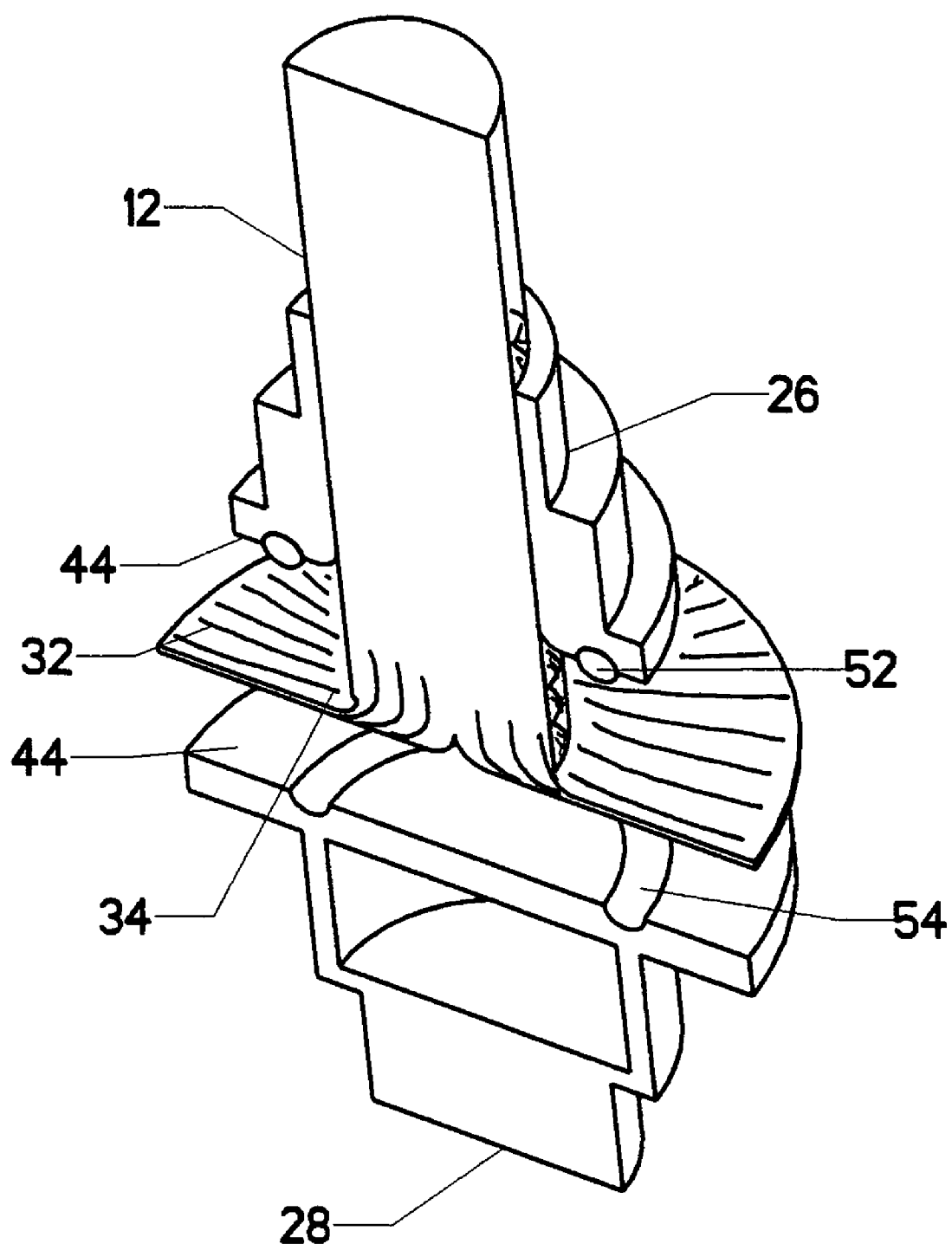
FIG. 20 is an isometric view, showing a clamping system incorporating an O-ring and a groove.

FIG. 20 shows a clamping system incorporating an O-ring and corresponding groove. Upper barrier 26 has flat barrier surface 44 facing downward. O-ring 52, which is made of pliable material, is located on this downward facing surface. Lower barrier 28 has a corresponding flat barrier surface 44 facing upward. This surface optionally includes a groove 54 placed to align with O-ring 52. When the two barriers clamp together, the exposed strands are separated into exposed region 32 and guarded region 34. A version of lower barrier 28 which omits groove 54 is also possible. In this version, O-ring 52 simply compresses the strands against flat barrier surface 44 on lower barrier 28. Although the O-ring is shown as having a circular cross section, flat O-rings, square O-rings, or other shapes can be used as well.

Figure 9:
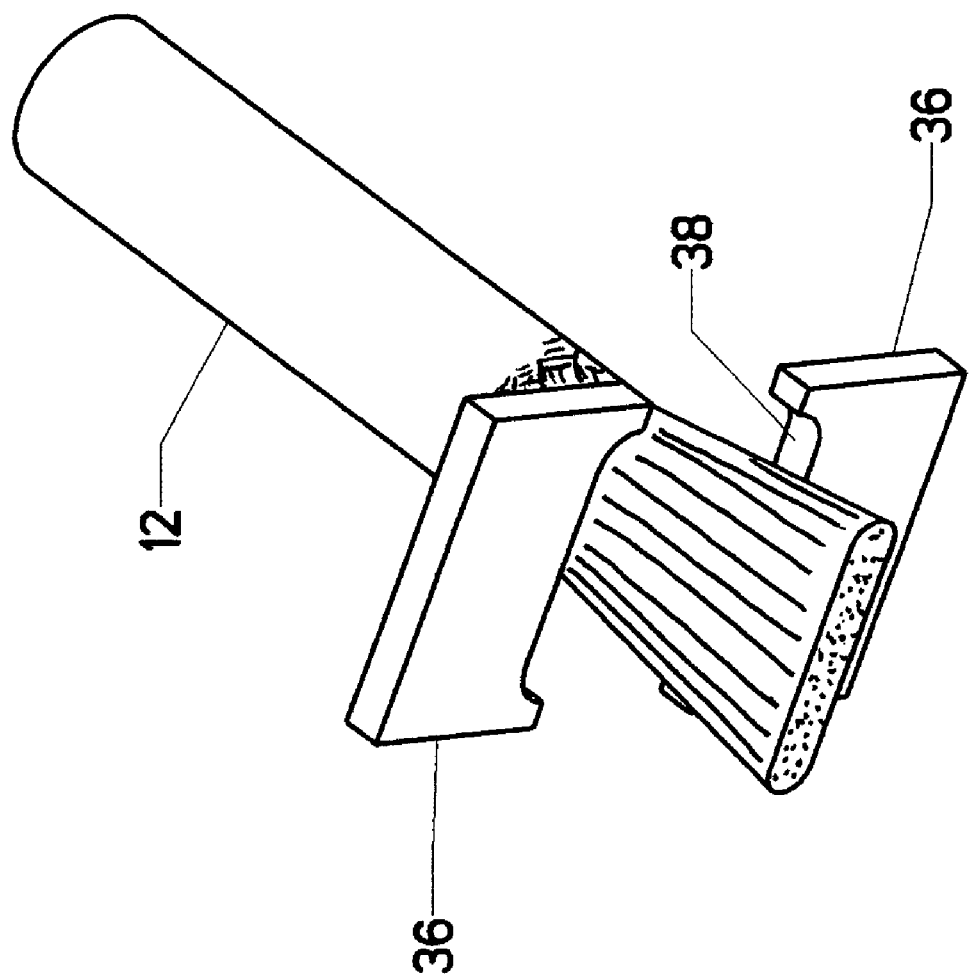
FIG. 9 is an isometric view, showing the application of the proposed process to an intermediate termination.

Those skilled in the art will realize that many types of barrier devices are possible. Radially symmetric devices have been shown, but planar devices are possible as well. FIG. 9 shows exposed strands being held between two linear barriers 36. Each linear barrier 36 can optionally have a strand slot 38 positioned to clamp the exposed strands into an approximately planar fan. This action also creates an exposed region 32 and a guarded region 34.

The linear barrier need not be straight. FIG. 15 shows two curved barriers 48 being clamped over a region of fanned strands. Like the straight version, curved barriers 48 optionally include strand slots 38.

Figure 14:
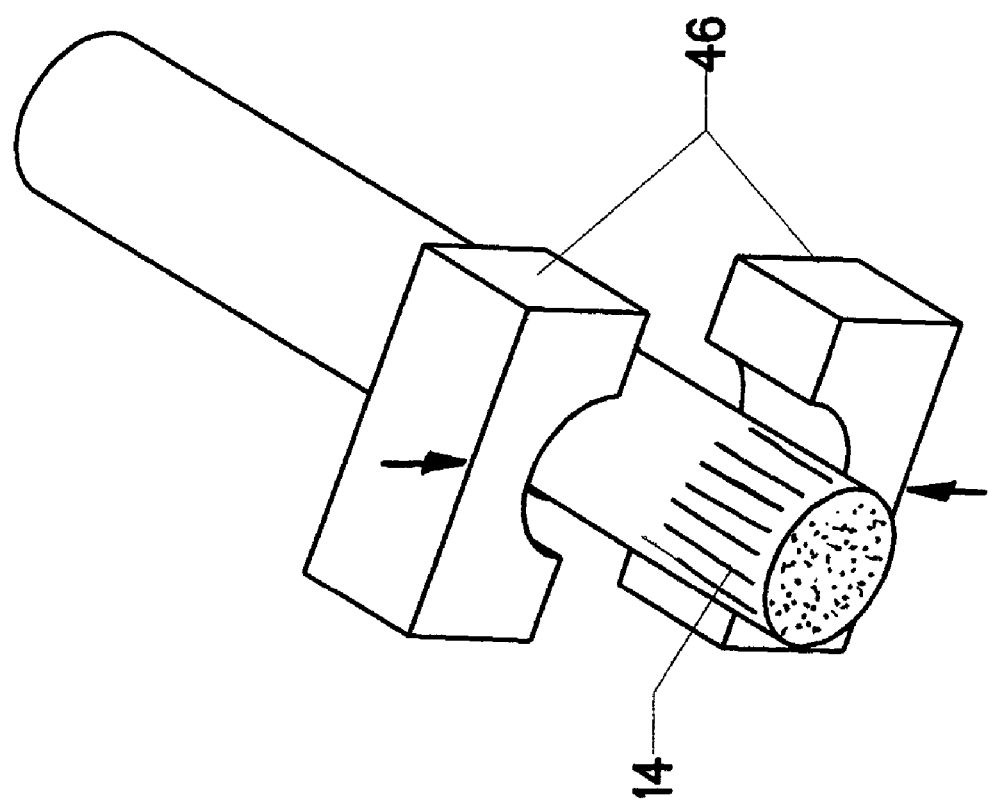
FIG. 14 is an isometric view, showing the use of cylindrical clamps.

The same type of guarding system can be applied to unfanned strands. FIG. 14 shows a cable with exposed strands 14 ready for wetting. Two cylindrical clamps 46 are pressed around a portion of the exposed strands (and optionally a portion of the cable jacket, if there is one) to divide the strands into guarded and unguarded regions.

Figure 14B:
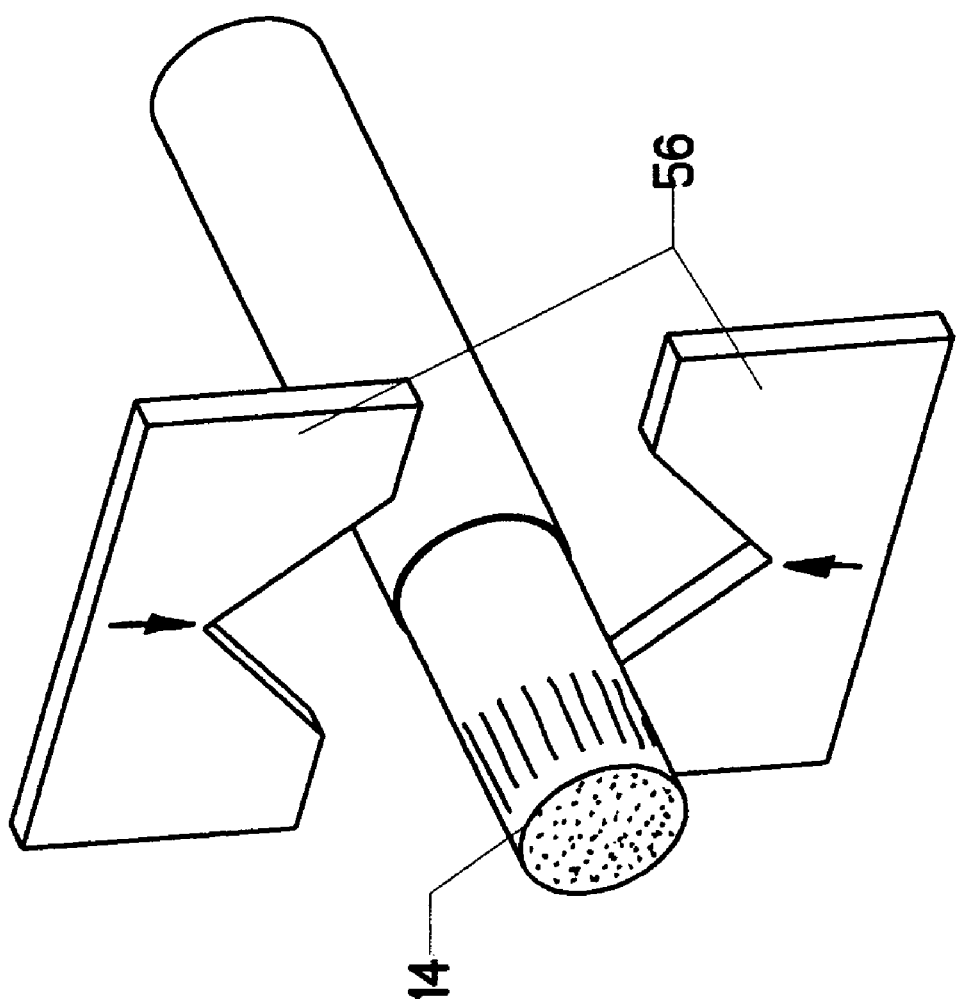
FIG. 14B is an isometric view, showing the use of eve clamps.

FIG. 14B shows the use of vee clamps 56. These incorporate "vee" notches which are capable of closing over cables of varying diameter. The two vee clamps 56 are offset (The upper clamp in the view is slightly forward of the lower clamp) so that the vee notches can overlap. Those skilled in the art will realize that the type of vee notches shown can be adapted for use in most of the other clamping devices in this disclosure.

Figure 10:
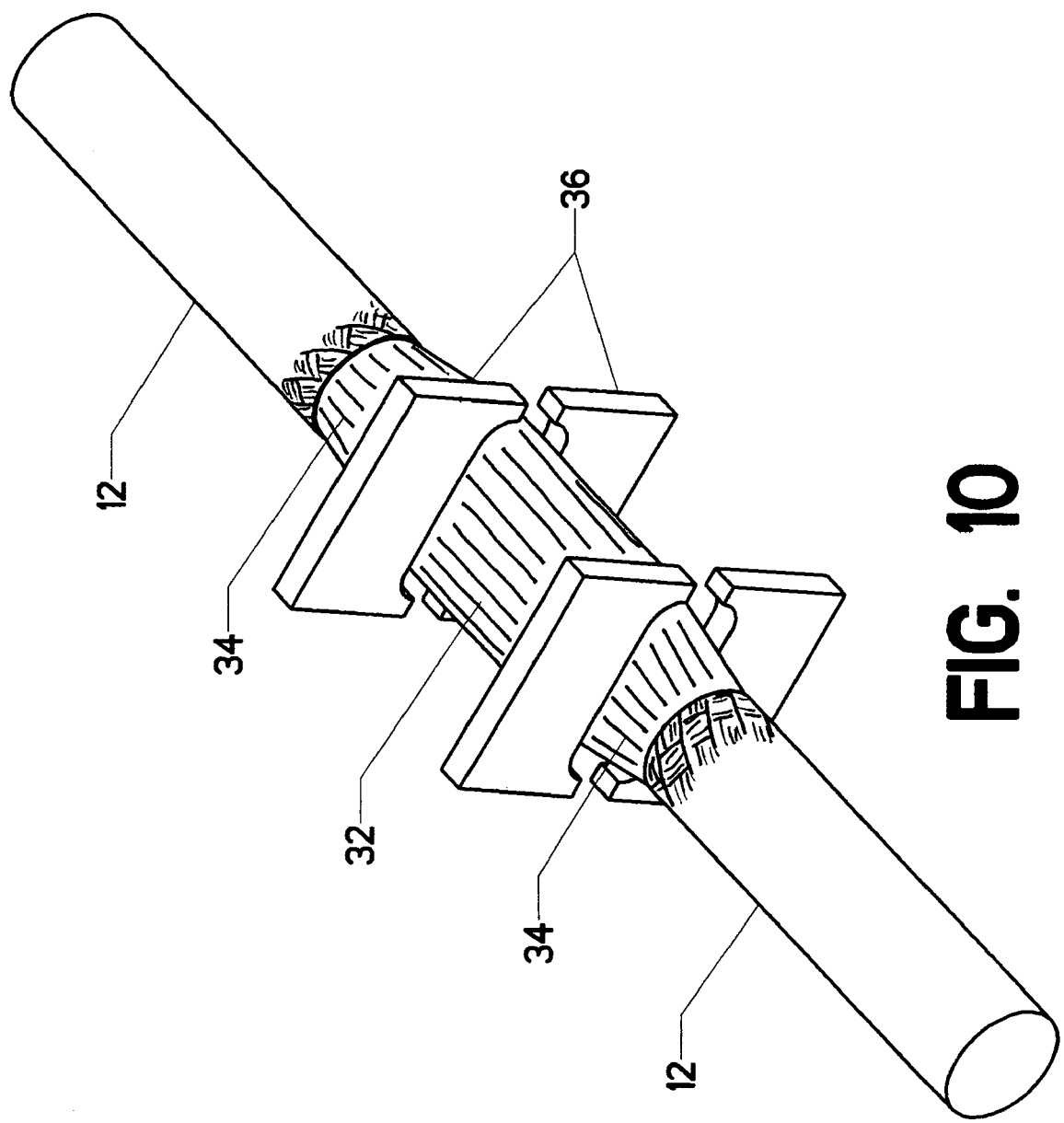
FIG. 10 is an isometric view, showing the application of the proposed process to an intermediate termination.

Although the devices disclosed are most commonly used in attaching an anchor to an end of a cable, they can also be used for attaching an anchor somewhere in the middle of a cable. FIG. 10 shows a cable wherein containment jacket 12 has been stripped away in a middle portion to reveal exposed strands. The region of exposed strands is divided from the rest of the cable by a first boundary (The upper boundary in the view) and a second boundary (The lower boundary in the view). Two sets of linear barriers 36 are clamped to the exposed strands in order to create an exposed region 32 and a guarded region 34. As for the radially symmetric applications, the potting compound is applied to exposed region 32 and an anchor is then potted (i.e., bonded) to these strands.

Figure 11:
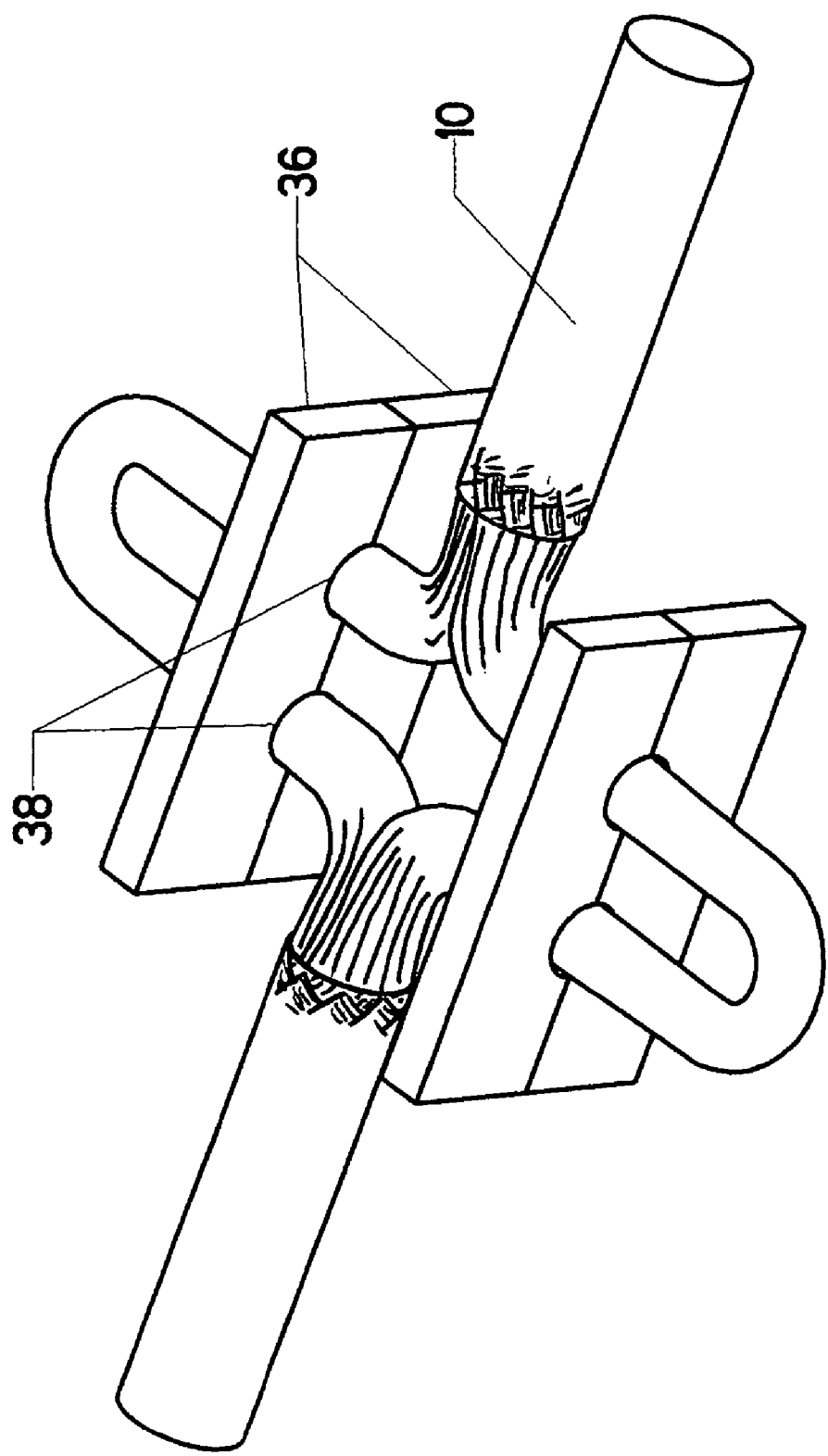
FIG. 11 is an isometric view, showing the application of the proposed process to an intermediate termination.

FIG. 11 shows another type of intermediate termination. The strands of cable 10 have been exposed for a longer span and pulled into two opposing loops. These loops are then held in place by a different embodiment of linear barrier 36. The embodiment shown has two strand slots 38. The exposed loops (projecting outward) are wetted for potting. Although a jacketed cable is shown in the illustration, the devices would work for an unjacketed cable as well (true for the balance of this disclosure as well).

Figure 19:
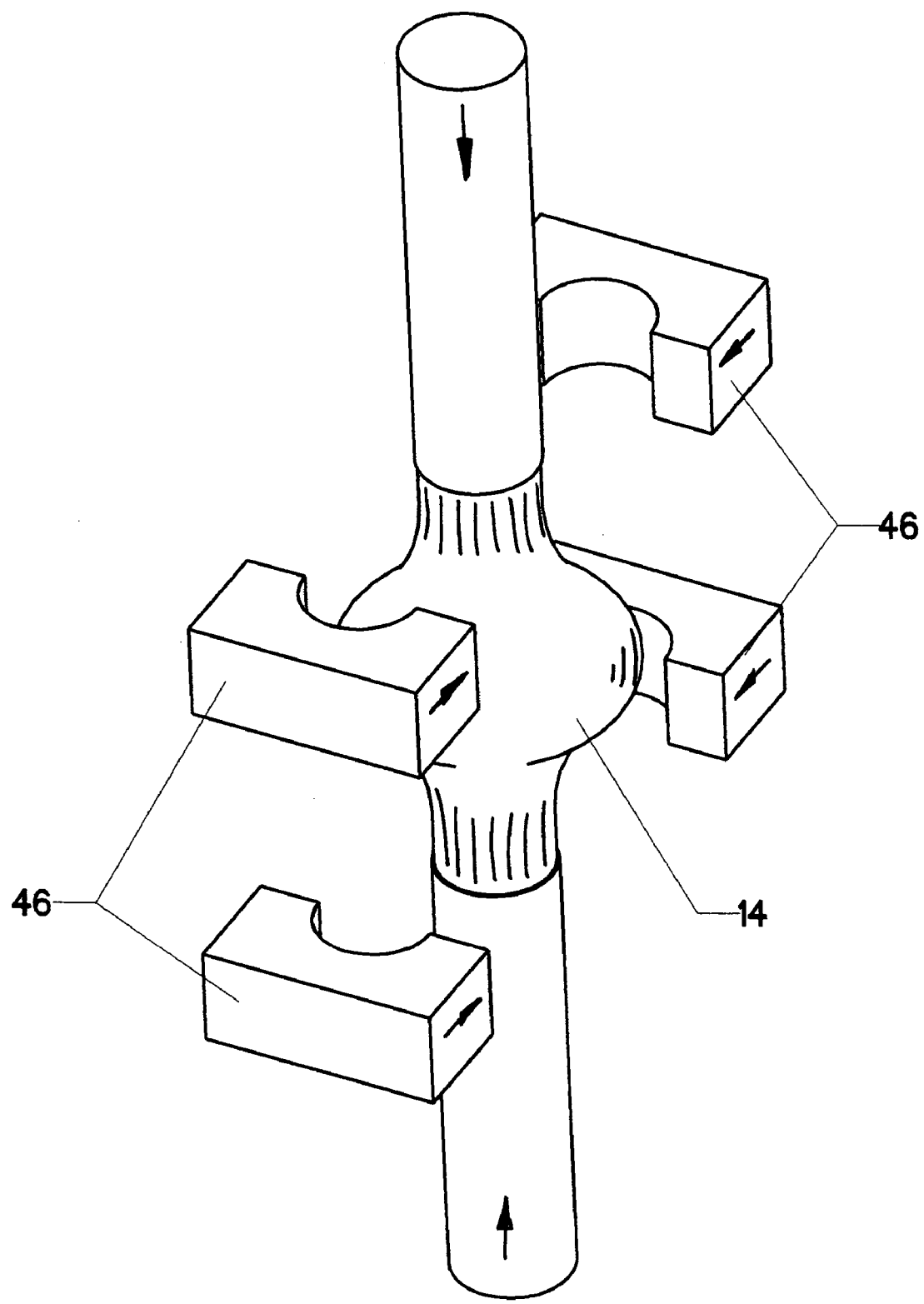
FIG. 19 is an isometric view, showing clamps designed for use when wetting a portion of strands exposed in the middle of a cable.

FIG. 19 shows a simpler type of intermediate termination. A portion of the containment jacket is stripped away to reveal exposed strands 14. The cable is then placed under compression to "upset" the exposed strands into a bulge as shown (This is an optional step, but it does promote strand wetting since it increases the space between the strands). Two sets of cylindrical clamps 46 are then applied to segregate the portion of the strands that will receive the potting compound (the bulged area) from the rest of the cable.

Figure 22:
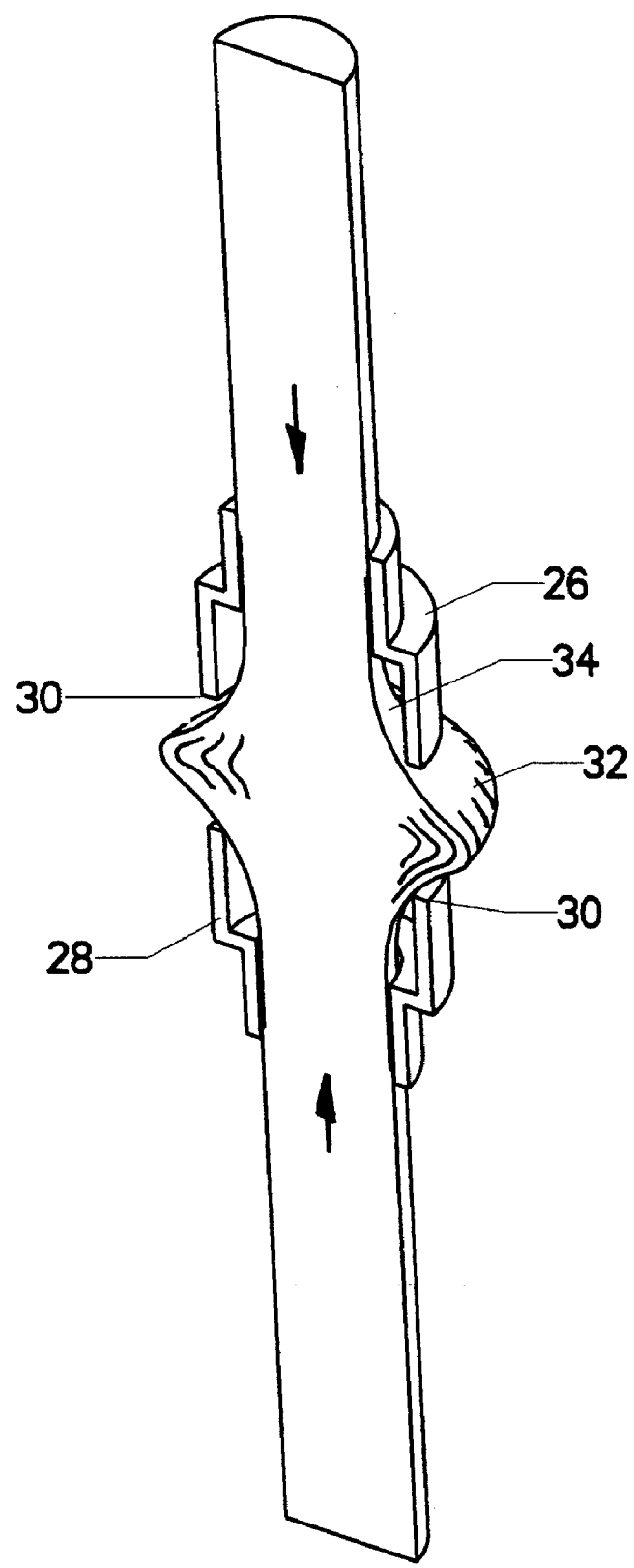
FIG. 22 is an isometric view, showing clamps designed for use when wetting a portion of strands exposed in the middle of a cable.

FIG. 22 shows another approach to the same problem. After stripping away a portion of the containment jacket, the cable has been compressed to form a bulge in the region of the exposed strands. Upper barrier 26 and lower barrier 28 are then pressed together to clamp over the bulge. Exposed region 32 lies outside (in the radial direction) of the two barriers, while guarded region 34 lies inside the two barriers. Liquid potting compound is then infused through the exposed strands.

Other methods of exposing the strands for potting compound infusion may be needed. FIG. 16 shows a cable with a length of exposed strands 14 on its end (The cable is shown sectioned for visual clarity). The free ends of these strands have been fanned and bent back to form a "collar" around the cable itself. Two cylindrical clamps 46 are placed on either side of the "strand collar" and pressed together to hold the strand collar against the cable. The region of strands above the cylindrical clamps (in the context of the orientation shown in the view) are then within the exposed region and the portion of the strands lying beneath the clamps comprise the guarded region. The exposed region therefore lies between the clamps and the free end of the exposed strands.

Figure 17:
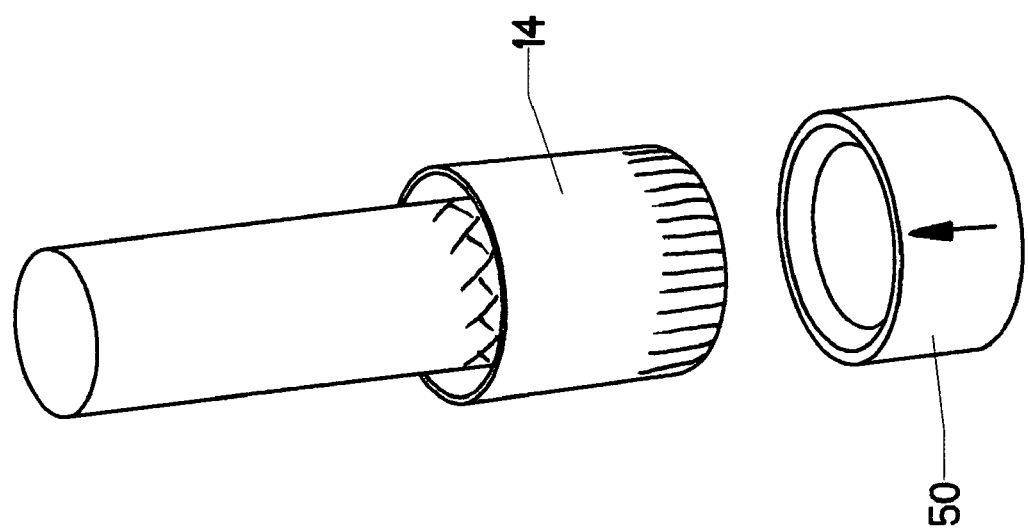
FIG. 17 is an isometric view, showing a collar designed to hold strands which have been folded back over the cable.
Figure 18:
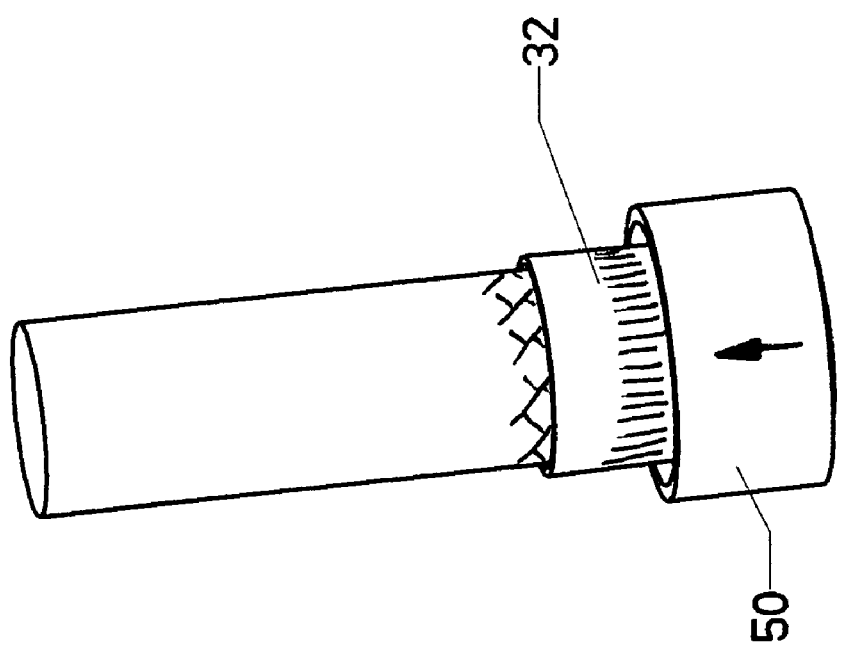
FIG. 18 is an isometric view, showing a collar designed to hold strands which have been folded back over the cable.

Other devices can be used to hold the strand collar in place. FIG. 17 shows another cable with its exposed strands folded backward to form a strand collar. Collar 50, which has a bore through its center, is then slid upward to the position shown in FIG. 18 (A chamfer on the upper surface of the collar eases its passage over the strands). The strands exposed above collar 50 in FIG. 18 then comprise exposed region 32 (the portion lying between collar 50 and the free end of the exposed strands). The potting compound can be applied to these exposed strands using known techniques.

In the field of synthetic cables, which typically feature small strands, the potting compounds used would often be liquid polymers which harden over time (reactive resins, air-drying resins, etc.). For wire rope, the potting compounds may also include molten metals. Thermoplastics have also been used as potting compounds. The reader will appreciate that the methods and devices disclosed are not dependent upon the type of potting compound nor the type of cable. Although the illustrations are focused on small-strand cables, the invention is not limited to this application.

Those skilled in the art will also realize that the barrier devices could be incorporated into the anchor itself Thus, the barrier might not be removed but rather left to form part of the potted termination. The devices shown could also be adapted to non-round cable shapes (such as square cable).

Figure 21:
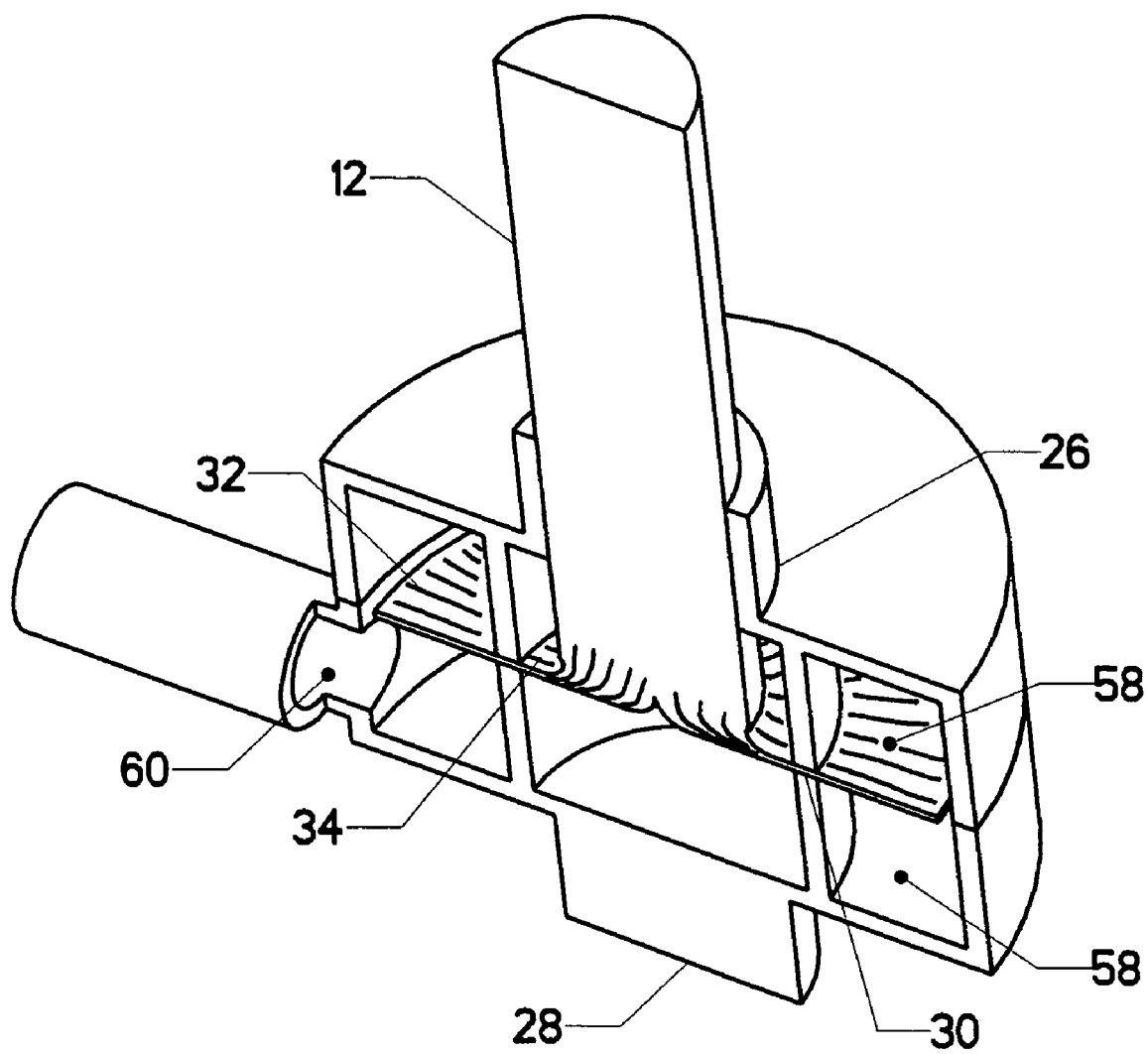
FIG. 21 is an isometric view, showing a clamping system incorporating a molding cavity.

Pressurized injection may optionally be used to achieve complete strand infusion. FIG. 21 shows a modified version of the upper and lower barriers designed to accomplish pressurized infusion. The upper and lower barriers incorporate barrier edges 30 which are the same as the version shown in FIG. 6. However, an annular cavity has been added to both the barriers. When the two barriers are clamped together—as shown—mold cavity 58 is formed around exposed region 32. Liquid potting compound is then injected under pressure through injection port 60. Vents are provided to vent the air in the mold cavity, in order to allow the liquid potting compound to fill the cavity and completely infuse the strands.

Although the preceding description contains significant detail, it should not be construed as limiting the scope of the invention but rather as providing illustrations of the preferred embodiments of the invention.

Having described my invention, I claim:

1. A method for infusing potting compound into an exposed length of strands within a cable, wherein said exposed length of strands are exposed on an end of said cable so that said length of exposed strands has a fixed end attached to said cable and a free end, comprising:
   a. placing a first barrier around said length of exposed strands proximate said fixed end;
   b. splaying said length of exposed strands outward to form a fan, having a first side facing said first barrier and a second side facing away from said first barrier;
   c. placing a second barrier proximate said fan on said second side;
   d. pressing said first and second barriers together to hold said fan in place and divide said fan into an exposed region, which lies outside said first and second barriers, and a guarded region, which lies inside said first and second barriers; and
   e. infusing said potting compound into said exposed region.

2. A method as recited in claim 1, further comprising:
   a. providing said first barrier with a first barrier edge facing said free end of said exposed strands, wherein said first barrier edge assumes the form of a truncated cone;
   b. providing said second barrier with a second barrier edge facing said first barrier edge, wherein said second barrier edge assumes the form of a truncated cone, so that when said first and second barriers are pressed together, said fan of exposed strands is deflected into a truncated cone.

3. A method as recited in claim 1, further comprising providing said first barrier with a strand slot and providing said second barrier with a strand slot.

4. A method as recited in claim 1, wherein said first barrier is curved and wherein said second barrier is curved.

5. A method as recited in claim 1, further comprising providing said first barrier with an O-ring positioned to bear against said fan when said first and second barriers are pressed together.

6. A method as recited in claim 5, further comprising providing said second barrier with a groove aligned with said O-ring.

7. A method for infusing potting compound into an exposed length of strands within a cable, wherein said exposed length of strands are exposed on an end of said cable so that said length of exposed strands has a fixed end attached to said cable and a free end, comprising:
   a. folding said free end of said length of exposed strands back over said cable to form a strand collar;
   b. placing a first barrier on a first side of said strand collar;
   c. placing a second barrier on a second side of said strand collar;
   d. pressing said first and second barriers together to hold said strand collar against said cable and divide said strand collar into an exposed region, which lies between said first and second barriers and said free end, and a guarded region; and
   e. infusing said potting compound into said exposed region.

8. A method for infusing potting compound into an exposed length of strands within a cable, wherein said exposed length of strands are exposed on an end of said cable so that said length of exposed strands has a fixed end attached to said cable and a free end, comprising:
   a. folding said free end of said length of exposed strands back over said cable to form a strand collar;
   b. sliding a collar over said strand collar to hold said strand collar against said cable and divide said strand collar into an exposed region, which lies between said collar and said free end, and a guarded region; and
   c. infusing said potting compound into said exposed region.

9. A method for infusing potting compound into an exposed length of strands within a cable, wherein said cable has a first end and a second end, wherein said exposed length of strands are exposed somewhere between said first and second ends of said cable, wherein said exposed length of strands has a first boundary and a second boundary, comprising:
   a. placing a first barrier around said length of exposed strands proximate said first boundary of said exposed strands;
   b. placing a second barrier around said length of exposed strands proximate said second boundary of said exposed strands;
   c. placing said cable in compression to form a bulge of strands between said first and second barriers, wherein said bulge extends outward beyond said first and second barriers, so that an exposed region of strands lies outside said first and second barriers and a guarded region of strands lies inside said first and second barriers;
   d. pressing said first and second barriers together; and
   e. infusing said potting compound into said exposed region.

* * * * *